United States Patent
Tamura

[11] Patent Number: 5,997,996
[45] Date of Patent: Dec. 7, 1999

[54] SHEET-LIKE PRESSURE-SENSITIVE RESISTANCE MEMBER HAVING ELECTRODES, METHOD OF MAKING THE SAME, AND SHEET-LIKE PRESSURE-SENSITIVE RESISTANCE MEMBER

[75] Inventor: Yasuhiro Tamura, Tokyo, Japan

[73] Assignee: A-Plus Corporation, Tokyo, Japan

[21] Appl. No.: 08/827,090

[22] Filed: Mar. 27, 1997

[30] Foreign Application Priority Data

Mar. 27, 1996 [JP] Japan .................................. 8-073000
Oct. 4, 1996 [JP] Japan .................................. 8-264783

[51] Int. Cl.$^6$ ..................................................... B32B 15/00
[52] U.S. Cl. ........................ 428/209; 428/323; 428/338; 428/339; 428/378; 428/407; 338/114; 338/115; 252/511; 252/518
[58] Field of Search .................................... 428/209, 323, 428/339, 378, 407, 338; 338/114, 115; 252/511, 518

[56] References Cited

U.S. PATENT DOCUMENTS

| | | | |
|---|---|---|---|
| 4,145,317 | 3/1979 | Sudo et al. ................................. | 252/512 |
| 4,996,511 | 2/1991 | Ohkawa et al. ........................... | 338/114 |
| 5,431,571 | 7/1995 | Hanrahan et al. ........................ | 428/901 |
| 5,484,648 | 1/1996 | Odashima et al. ........................ | 428/209 |
| 5,629,073 | 5/1997 | Lovell ........................................ | 428/209 |

*Primary Examiner*—William Krynski
*Assistant Examiner*—Cathy F. Lam
*Attorney, Agent, or Firm*—Birch, Stewart, Kolasch & Birch

[57] ABSTRACT

An electrode-provided sheet-like pressure-sensitive resistance member includes a sheet-like pressure-sensitive resistance member which includes conductive particles arranged such that the conducting direction of the conductive particles intersects a surface of the sheet-like pressure-sensitive resistance member, a sheet-like protective member for protecting the sheet-like pressure-sensitive resistance member, and a sheet-like electrode member composed of a substrate and electrodes formed thereon. Accordingly, it becomes possible to sufficiently increase the durability of the electrode-provided sheet-like pressure-sensitive resistance member and to form it into an arbitrary shape. Also, needle-shaped conductive particles and spherical non-conductive particles are dispersed within a resin material in a state in which the needle-shaped conductive particles are in close contact with the surface of the spherical non-conductive particles, whereby the conducting direction of the conductive particles intersects the surface of the sheet-like pressure-sensitive resistance member. Accordingly, it becomes possible to effectively transmit variations in externally applied pressure, thereby greatly increasing the transmission sensitivity for information about the applied pressure.

11 Claims, 7 Drawing Sheets

SHEET-LIKE PRESSURE-SENSITIVE RESISTANCE MEMBER HAVING ELECTRODES, METHOD OF MAKING THE SAME, AND SHEET-LIKE PRESSURE-SENSITIVE RESISTANCE MEMBER

BACKGROUND OF THE INVENTION

1. Field of the Invention

The present invention relates to a sheet-like pressure-sensitive resistance member having electrodes (hereinafter referred to as an "electrode-provided sheet-like pressure-sensitive resistance member"), a method of manufacturing the electrode-provided sheet-like pressure-sensitive resistance member, and a sheet-like pressure-sensitive resistance member itself.

2. Description of the Related Art

Conventionally, sheet-like pressure-sensitive resistance members having electrodes (hereinafter referred to as "pressure-sensitive resistance film") are formed by bonding together a sheet-like pressure-sensitive resistance member (hereinafter referred to as "conductive film") formed by using a conductive material such as carbon, and a sheet-like electrode member (hereinafter referred to as "electrode film") having a desired electrode pattern of silver formed thereon by, for example, printing a silver material. The pressure-sensitive resistance film thus formed changes its resistance value at a portion where a pressure is applied externally.

However, since the conventional pressure-sensitive resistance film uses an electrode film on which a silver material is printed, it has the drawbacks that cracks are generated in the electrodes after the printed silver material has been dried, resulting in poor durability, and that the pressure-sensitive resistance film cannot be formed into a desired shape.

Furthermore, connection between individual electrodes on the electrode film and resistance-value-information take-out leads, which is normally made or completed by soldering, is very difficult to attain due to the electrodes made of silver.

The conventional sheet-like pressure-sensitive resistance member, which is one structural component of the pressure-sensitive resistance film, includes a particulate conductive material. Since the particles are not uniformly arranged in such a manner that the direction of electrical conduction (hereinafter referred to as the "conducting direction") of the conductive material (particles) intersects the sheet surface, the resistance value on the surface of the sheet-like pressure-sensitive resistance member tends to vary depending on the position on the sheet surface. Therefore, a constant sensitivity in transmitting externally applied pressures cannot be maintained. More particularly, when the external pressure is very small, it is normally impossible to obtain information about the applied pressure with fidelity.

SUMMARY OF THE INVENTION

In view of the above-described problems, it is an object of the present invention to provide an electrode-provided sheet-like pressure-sensitive resistance member which is highly durable and can be formed into any desired shape, and also to provide a method of manufacturing such an electrode-provided sheet-like pressure-sensitive resistance member.

A further object of the present invention is to provide a sheet-like pressure-sensitive resistance member having conductive particles arranged such that the conducting direction of the conductive particles uniformly intersects the sheet surface so as to eliminate variations in resistance value on the sheet surface in order to secure efficient transmission of a change in external pressure, thereby greatly increasing the transmission sensitivity for information about the applied pressure.

To achieve the above objects, the present invention provides an electrode-provided sheet-like pressure-sensitive resistance member which comprises a sheet-like pressure-sensitive resistance member including conductive particles which are arranged such that the conducting direction of the conductive particles intersects a surface of the sheet-like pressure-sensitive resistance member; a sheet-like protective member for protecting the sheet-like pressure-sensitive resistance member; and a sheet-like electrode member composed of a substrate and electrodes formed on the substrate by superposing a silver-containing member on an electrode pattern formed of a copper member, wherein one surface of the sheet-like pressure-sensitive resistance member is joined with the sheet-like protective member, and the other surface of the sheet-like pressure-sensitive resistance member is joined with the surface of the sheet-like electrode member on which the electrodes are formed.

Accordingly, in the electrode-provided sheet-like pressure-sensitive resistance member of the present invention, since the durability of the electrode pattern of the sheet-like electrode member against deformation can be improved, the pressure-sensitive resistance member can be formed into any desired shape.

Preferably, the sheet-like pressure-sensitive resistance member is a pressure-sensitive resistance member which is formed by forming a mixture of conductive particles and a resin material into a sheet-like shape while applying a tensile force in the widthwise direction so as to arrange the conductive particles such that the conducting direction of the conductive particles provide becomes perpendicular to the surface of the pressure-sensitive resistance member.

Accordingly, in the electrode-provided sheet-like pressure-sensitive resistance member of the present invention, since increases and decreases in external pressure (applied pressure) can be very efficiently transmitted to the electrodes of the sheet-like electrode member, the sensitivity in detecting an increase/decrease of the pressure applied to the pressure-sensitive resistance member is greatly increased.

Preferably, one surface of the sheet-like pressure-sensitive resistance member and the sheet-like protective member are integrally joined together by heat treatment.

Accordingly, in the electrode-provided sheet-like pressure-sensitive resistance member of the present invention, in addition to the durability of the sheet-like electrode member, the durability of the sheet-like pressure-sensitive resistance member itself is greatly increased.

Preferably, the sheet-like electrode member is composed of a substrate and electrodes formed thereon. The electrodes are formed by superposing a paste material of a silver alloy, using a printing process, on an electrode pattern formed of a copper foil, and subsequently heat-treating the electrode pattern and the paste material.

Accordingly, in the electrode-provided sheet-like pressure-sensitive resistance member of the present invention, the durability of the electrode pattern itself is securely improved, and soldering operations, for example, for the electrodes are also become easier.

The present invention also provides a method of manufacturing an electrode-provided sheet-like pressure-sensitive resistance member. The method comprises the steps of preparing an assembly consisting of a sheet-like pressure-sensitive resistance member and a sheet-like protective member integrally joined by heat treatment with one surface of the sheet-like pressure-sensitive resistance member to protect the latter, the sheet-like pressure-sensitive resistance member including conductive particles which are arranged such that the conducting direction of the conductive particles intersects the surface of the sheet-like pressure-sensitive resistance member; preparing a sheet-like electrode member composed of a substrate and electrodes which are formed on the substrate by superposing a silver-containing member on an electrode pattern made of a copper material, and subsequently heat-treating the electrode pattern and the silver containing member; and joining the other surface of the sheet-like pressure-sensitive resistance member with the surface of the sheet-like electrode member on which the electrodes are formed.

Accordingly, the method of manufacturing an electrode-provided sheet-like pressure-sensitive resistance member of the present invention makes it possible to manufacture an electrode-provided sheet-like pressure-sensitive resistance member, which has desired durability and can be formed in an arbitrary shape, by an extremely simple process, so that the method is advantageous in terms of manufacturing cost.

The present invention further provides a sheet-like pressure-sensitive resistance member which includes a resin material, needle-shaped conductive particles made of potassium titanate and coated with tin oxide film, and spherical non-conductive particles made of potassium titanate, wherein the needle-shaped conductive particles and the spherical non-conductive particles are dispersed within the resin material in a state in which the needle-shaped conductive particles are in close contact with the surface of the spherical non-conductive particles, whereby the conducting direction of the conductive particles intersects the surface of the sheet-like pressure-sensitive resistance member.

The present invention further provides a sheet-like pressure-sensitive resistance member, wherein the needle-shaped conductive particles and the spherical non-conductive particles are dispersed within the resin material in a state in which the needle-shaped conductive particles are in close contact with the surface of the spherical non-conductive particles, whereby the conducting direction of the conductive particles intersects the surface of the sheet-like pressure-sensitive resistance member.

Accordingly, in the sheet-like pressure-sensitive resistance member of the present invention, since the needle-shaped conductive particles can be uniformly dispersed within the resin material such that the conducting direction intersects the sheet surface, it becomes possible to reduce variations in resistance value on the sheet surface, thereby obtaining stable resistance values. Therefore, even when a very small external pressure is applied to the sheet surface, information about the applied pressure can be extremely efficiently transmitted. Thus, the transmission sensitivity for information about the applied pressure can be greatly increased.

Moreover, since the needle-shaped conductive particles are made of potassium titanate and coated with tin oxide film and the spherical non-conductive particles are made of potassium titanate, the affinity between the needle-shaped conductive particles and the spherical non-conductive particles is excellent. Accordingly, the needle-shaped conductive particles can be securely brought into close contact with the surface of the spherical non-conductive particles.

Preferably, the needle-shaped conductive particles have a length of 10 to 20 micrometers, the tin oxide film has a thickness of 1 to 10 nanometer, and the spherical non-conductive particles have a diameter of several micrometers. Accordingly, in the sheet-like pressure-sensitive resistance member of the present invention, since the needle-shaped conductive particles can be dispersed at optimum intervals, the transmission sensitivity for information about pressures applied to the sheet surface is further greatly increased.

Preferably, the resin material is an acrylic urethane resin. Accordingly, in the sheet-like pressure-sensitive resistance member of the present invention, since the affinity between the needle-shaped conductive particles and the acrylic urethane resin and between the spherical non-conductive particles and the acrylic urethane resin is excellent, the needle-shaped conductive particles and the spherical non-conductive particles can be extremely easily blended into the resin material.

Preferably, the entire surface of each needle-shaped conductive particle is covered with a electrically conductive layer. Accordingly, in the sheet-like pressure-sensitive resistance member of the present invention, a wide choice of materials is available for the needle-shaped conductive materials, which increase the flexibility in forming the pressure-sensitive resistance member.

The present invention further provides a sheet-like pressure-sensitive resistance member formed by mixing needle-shaped conductive particles and spherical non-conductive particles into a resin material, in a state in which the needle-shaped conductive particles are in close contact with the surface of the spherical non-conductive particles, so as to obtain a mixture, and by subsequently applying the mixture onto a sheet-like resin material such that the conducting direction intersects the sheet surface. Accordingly, the sheet-like pressure-sensitive resistance member of the present invention can be formed by an extremely simple process, while maintaining the excellent transmission sensitivity.

Preferably, a sheet-like electrode member composed of a substrate and electrodes formed thereon is provided on the surface of the sheet-like resin material, on which surface the mixture of the needle-shaped conductive particles, the spherical non-conductive particles, and the resin is applied. Accordingly, in the sheet-like pressure-sensitive resistance member of the present invention, since information about applied pressure can be efficiently transmitted to the sheet-like electrode member even when the applied pressure is small, the contact area between the needle-shaped conductive particles and the electrodes greatly varies. Thus, the resistance value which is determined by the pressure-sensitive resistance member and the sheet-like electrode member varies, so that extremely accurate information about the pressure applied to the pressure-sensitive resistance member can be obtained.

Preferably, the mixture of the needle-shaped conductive particles, the spherical non-conductive particles, and the resin is screen-printed on the sheet-like resin material. Accordingly, in the sheet-like pressure-sensitive resistance member of the present invention, the mixture can be extremely easily applied in uniform thickness to the sheet-like resin material. Therefore, it is possible to greatly increase the transmission sensitivity for applied pressure.

DESCRIPTION OF THE PREFERRED EMBODIMENTS (a) Embodiment of the Invention

An embodiment of the present invention will now be described below with reference to the accompanying drawings.

(a1) Electrode-provided Pressure-sensitive Resistance Film

Figure 1:
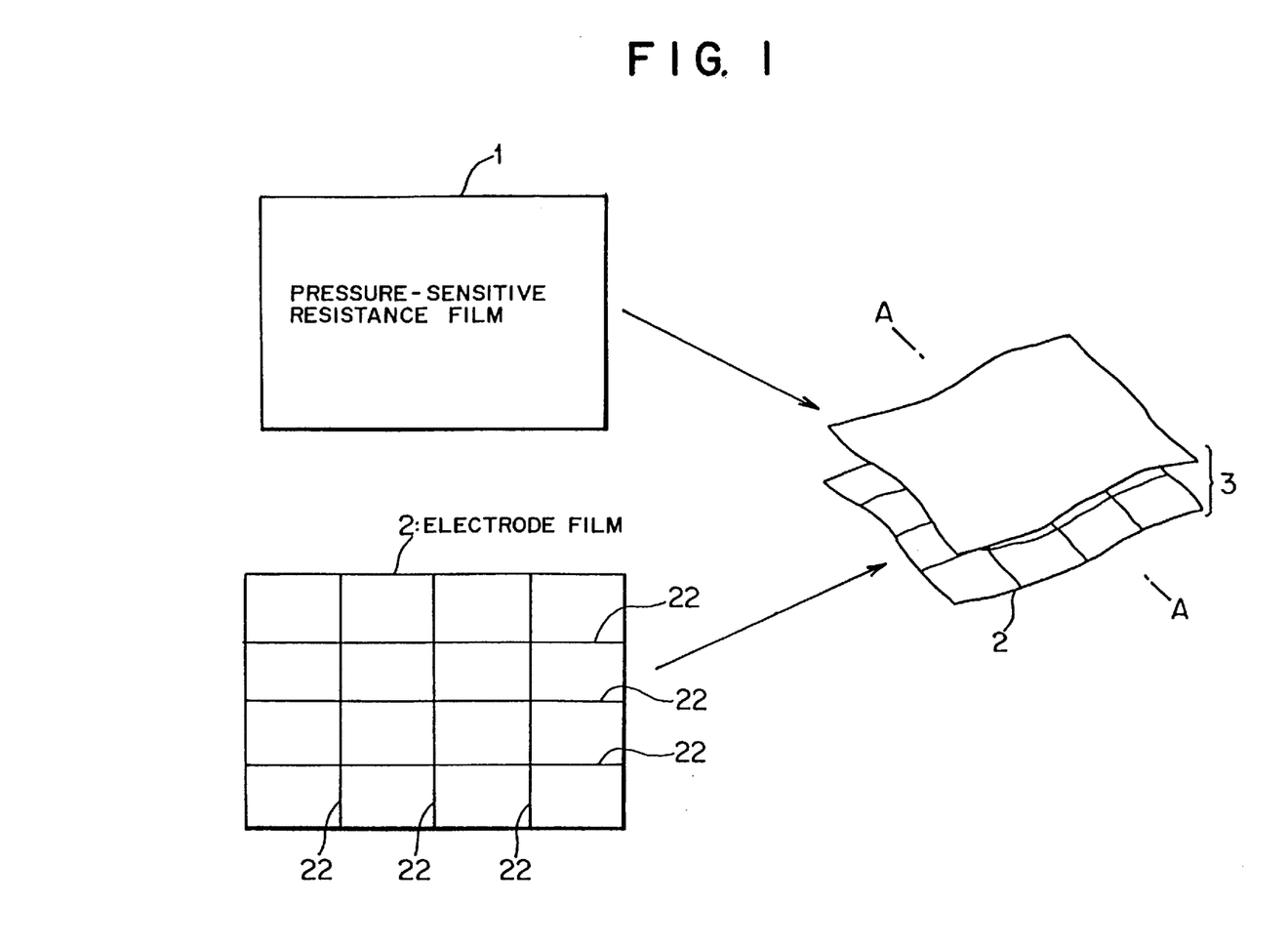
FIG. 1 is a schematic view showing one embodiment of the present invention.

FIG. 1 is a schematic view showing one embodiment of the present invention. In FIG. 1, reference numeral 1 denotes a pressure-sensitive resistance film, and 2 denotes an electrode film (sheet-like electrode member). In a manufacturing process described later, the pressure-sensitive resistance film 1 and the electrode film 2 are bonded (joined) together using an adhesive or the like to form an electrode-provided pressure-sensitive resistance film (electrode-provided sheet-like pressure-sensitive resistance member) 3.

Figure 2:
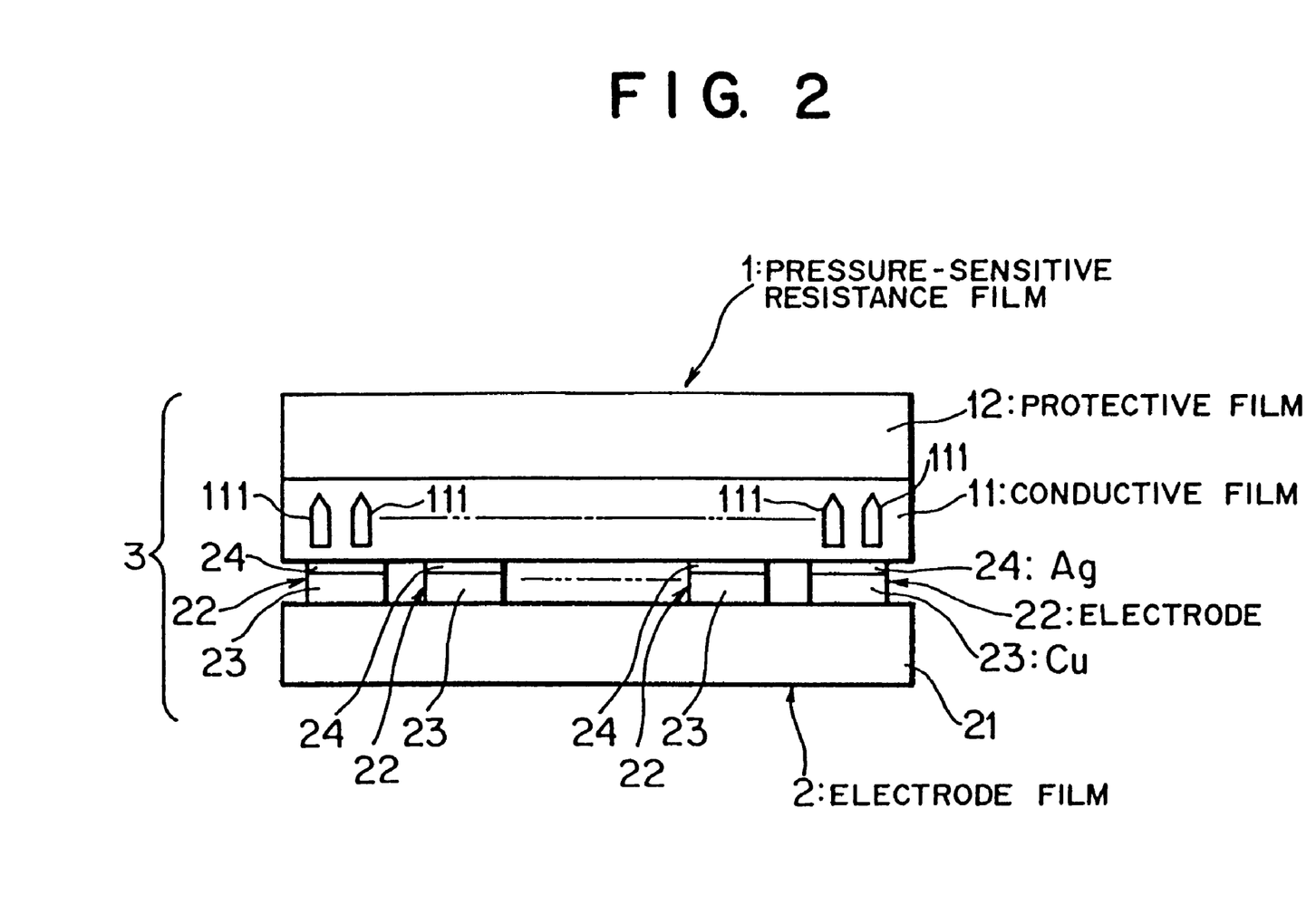
FIG. 2 is a schematic cross-sectional view taken along the line A—A of FIG. 1, showing an electrode-provided pressure-sensitive resistance film according to the embodiment of the present invention.

FIG. 2 is a cross-sectional view taken along the line A—A of FIG. 1. As schematically shown in FIG. 2, the pressure-sensitive film 1 includes a conductive film 11 and a protective film 12. The upper surface (one surface) of the conductive film 11 is joined with the protective film 12, and the lower surface (the other surface) thereof is joined with the electrode film 2. Thus, the above-mentioned electrode-provided pressure-sensitive resistance film 3 is produced.

The conductive film (sheet-like pressure-sensitive resistance member) 11, as shown in FIG. 2, contains conductive particles 111 arranged such that the conducting direction of the conductive particles intersects the surface of the conductive film 11. Specifically, the conductive particles 111 made of carbon, metal, or the like are mixed with a resin material, such as acrylic resin, silicone resin or polycarbonate (PBT). Then, the mixture is molded into a sheet while a tensile force is applied to the sheet in the widthwise direction thereof so as to orient the conductive particles 111 such that the conducting direction of the conductive particles perpendicularly intersects the surface of the molded sheet.

With the conductive particles 111 thus arranged, the conductive film 11 can very efficiently transfer increases or decreases in external pressure to the electrode film 2. Consequently, the sensitivity in detecting an increase/decrease of the pressure (or load) applied to the electrode-provided pressure-sensitive resistance film 3 is greatly increased. In addition, since the loaded position on the electrode-provided pressure-sensitive resistance film 3 is accurately transferred to a corresponding position on the electrode film 2, the detection sensitivity for the loaded position is also greatly increased.

The protective film (sheet-like protective member) 12 protects the conductive film 11 and is formed for this purpose using a protective member, such as polyester film or polyvinyl chloride film. As will be described later, the protective film 12 and the above-mentioned one surface (upper surface) of the conductive film 11 are subjected to heat treatment in order that they are integrally joined together to form the pressure-sensitive resistance film 1.

The thus formed pressure-sensitive resistance film 1 has increased durability while maintaining an appropriate degree of flexibility. In addition, by properly finishing the surface of the protective film 12, it is readily possible to improve the feel and texture of the protective film 12.

The electrode film 2 is manufactured using an etchable sheet-like substrate 21 that is made of epoxy or polyimide, for example, and is coated with a copper member (copper foil). The copper member of the substrate 21 is etched so as to form electrodes 22 arranged in a predetermined pattern (mesh-like pattern in FIG. 1). More particularly, to form the electrodes 22, a paste material (silver-base (containing) member: Ag) 24 formed from molten silver alloy (e.g., silver oxide having a silver content of about 90%) is applied onto an electrode pattern of copper member (copper foil: Cu) 23 by a suitable printing process, such as silkscreen, as shown in FIG. 2. The electrode pattern of copper member 23 and the paste material 24 applied thereto are then heat-treated at about 270° C. for about 20 seconds.

Figure 3:
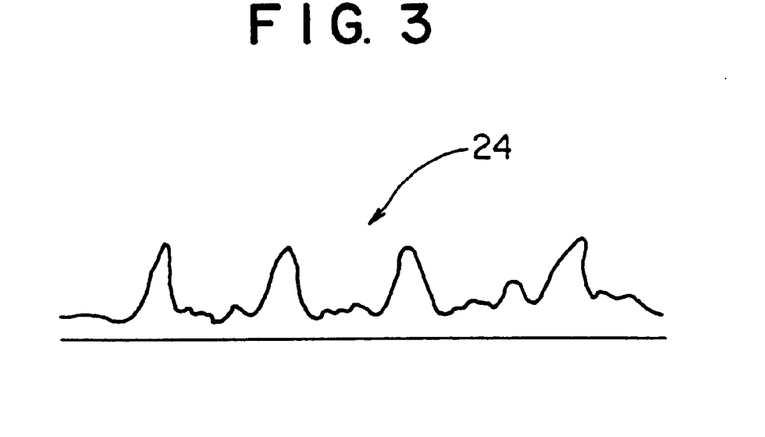
FIG. 3 is an enlarged schematic view showing an electrode surface of an electrode film according to the embodiment of the present invention.
Figure 4:
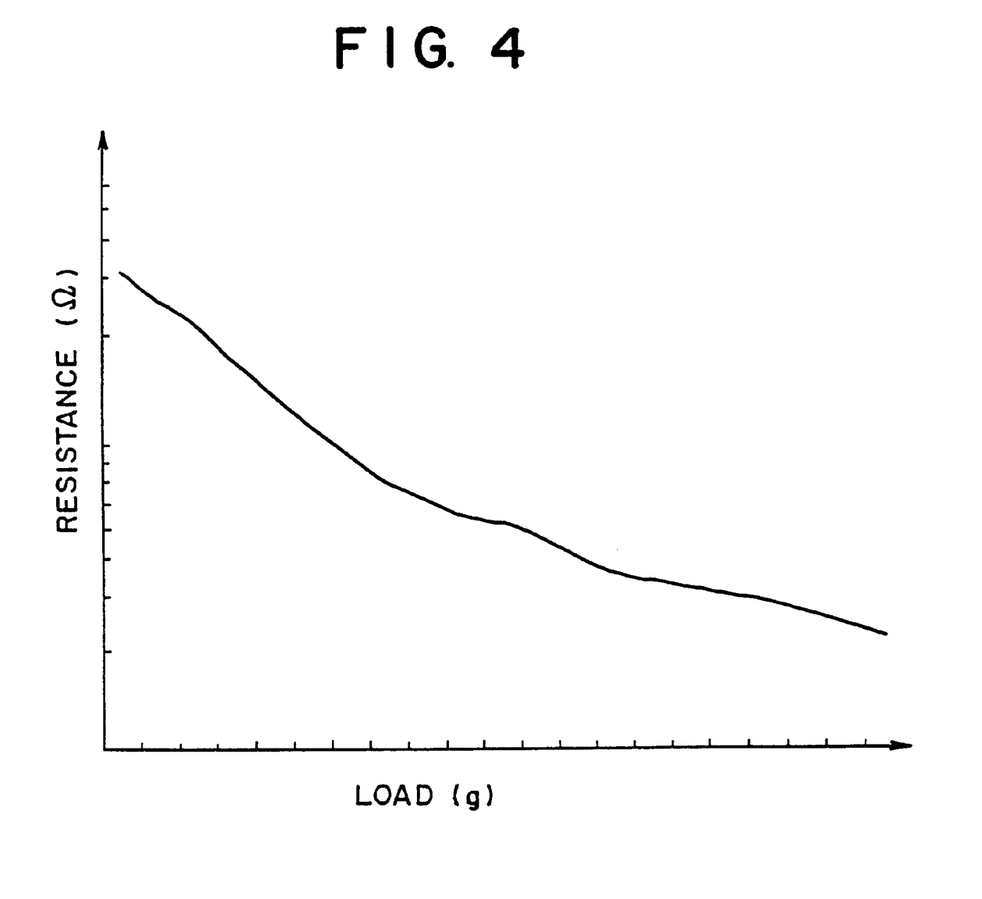
FIG. 4 is a graph showing the load-resistance characteristic of the electrode-provided pressure-sensitive resistance film according to the embodiment of the present invention.

By virtue of the processes described above, the hardness of the surface of the paste material (silver-base member) 24 is increased, thereby improving the durability of the electrodes 22 (electrode pattern) themselves. Soldering operations, for example, to connect leads to the electrodes 22 for taking out information about the change in resistance value are also become easier. In this embodiment, since the paste material 24 utilizes a silver alloy as described above, very small irregularities on the surface of the electrodes 22 remain, as schematically shown in FIG. 3, even after the heat treatment is achieved. Accordingly, as shown in FIG. 4, the resistance value of the pressure-sensitive resistance film 1 substantially varies with a change (increase and decrease) in contact area [i.e., a change (increase and decrease) in external pressure (external pressing force)]. This means that, even when a touch on the pressure-sensitive resistance film 1 is very light or small, information about the position of the touch and increase and decrease (changes) in the external pressure can be output from the pressure-sensitive resistance film 1 as a change in resistance value.

It was found through experiment that the above-mentioned pressure-sensitive resistance film 1, before being joined with the electrode film 2 has a resistance value of the order of $10^4$ Ω under no-load condition, and the electrode-provided pressure-sensitive resistance film 3 formed by joining together the pressure-sensitive resistance film 1 and the electrode film 2 has a resistance value greater than $10^5$ Ω under no-load condition.

Figure 5:
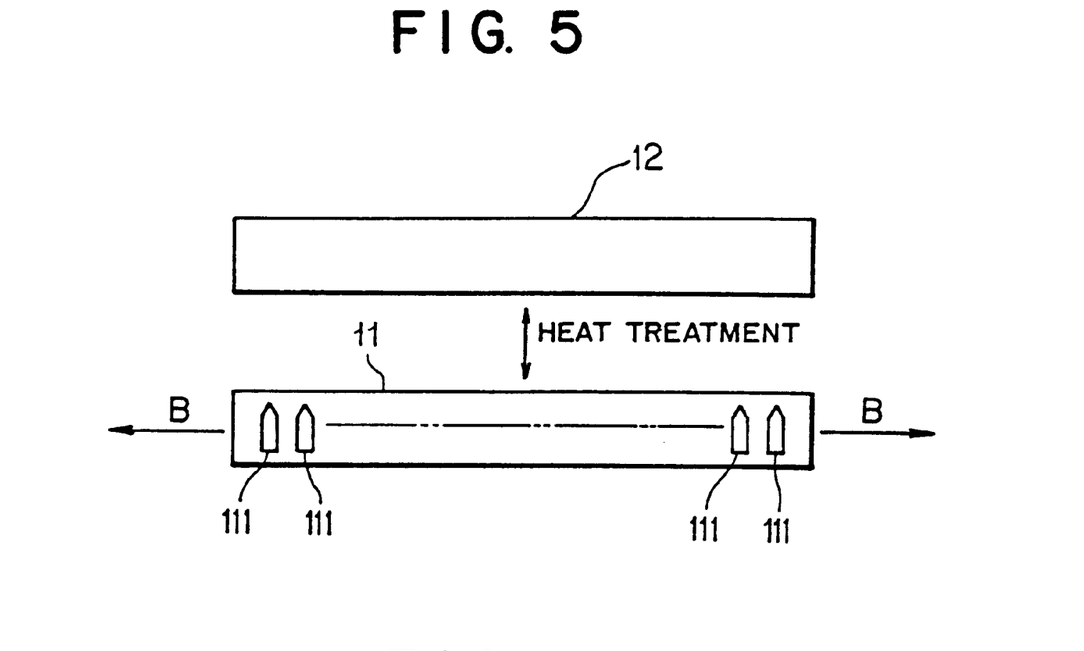
FIGS. 5 and 6 are schematic views showing a method of manufacturing the electrode-provided pressure-sensitive resistance film of the embodiment according to the present invention.

Now, a description will be given of a process for making the electrode-provided pressure-sensitive resistance film 3. As shown in FIG. 5, for example, conductive particles (carbon, metal or the like) 111 are mixed with a resin material (acrylic resin, silicone resin or the like), and the resultant mixture is molded into a sheet-like shape. At this time, a tensile force is applied in the widthwise direction, as indicated by the arrows B shown in FIG. 5. By this process, a conductive film 11 is manufactured in which the conductive particles 111 are arranged in the conductive film 11 such that they are arranged to have a conducting direction perpendicular to the surface of the conductive film 11.

Thereafter, in order to protect the conductive film 11, a protective film 12 is integrally joined to an upper surface (one surface) of the conductive film 11 by heat treatment. A pressure-sensitive resistance film 1 is thus formed.

Figure 6:
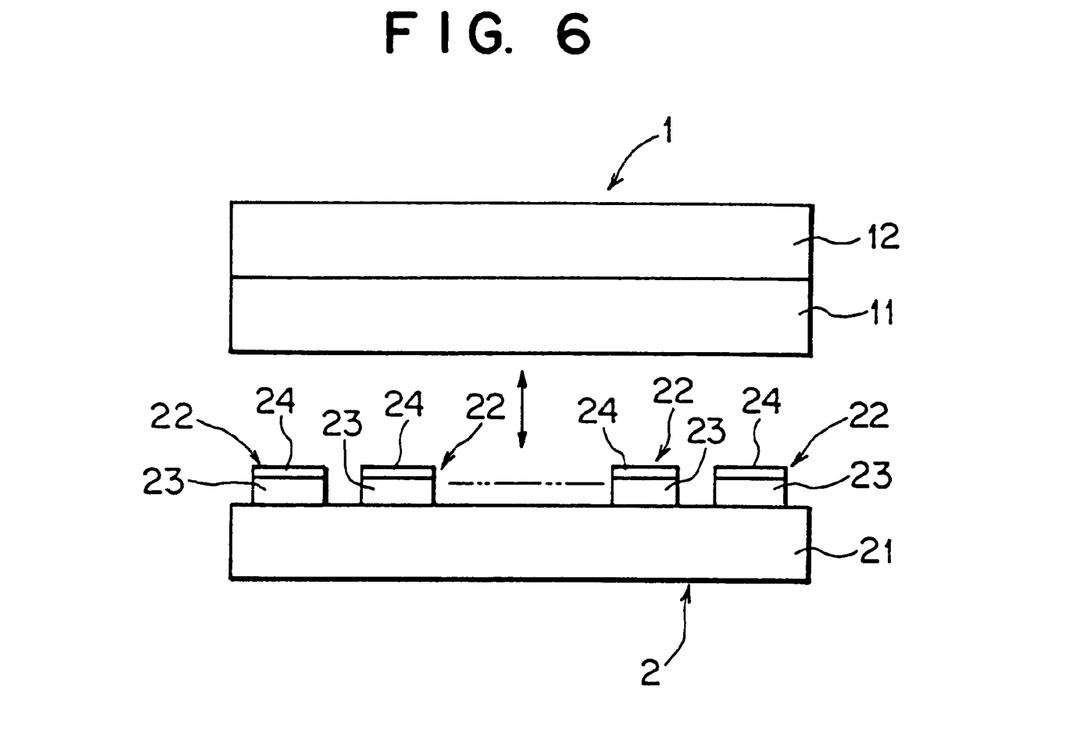

Then, as shown in FIG. 6, an electrode film 2 with electrodes 22 is prepared by superposing a silver-base member (silver alloy) 24 on an electrode pattern of copper member (copper foil) 23 on a substrate 21, followed by heat treatment of the superposed members 23 and 24. To the lower surface (the other surface) of the pressure-sensitive resistance film 1 (conductive film 11), the surface of the electrode film 2 on which the electrodes 22 are formed is joined by bonding with an adhesive, for example, thereby forming a electrode-provided pressure-sensitive resistance film 3.

There is no limitation about the order in making the pressure-sensitive resistance film 1 (composed of the conductive film 11 and the protective film 12) and the electrode film 2. The above-described order may be reversed to prepare the electrode film 2 first.

According to the foregoing embodiment, the electrode-provided pressure-sensitive resistance film (electrode-provided sheet-like pressure-sensitive resistance member) 3 includes the pressure-sensitive resistance film 1 (composed of the conductive film 11 having conductive particles 111 arranged such that the conducting direction of the conductive particles uniformly intersects the sheet surface, and the protective film 12 for protecting the conductive film 11); and the electrode film 2 in which there are formed on the substrate 21 the electrodes 22 which are formed by superposing the silver-base member (silver alloy) 24 on the electrode pattern 23 made of copper member (copper foil). One surface of the conductive film 11 is joined with the protective film 12, and the other surface of the conductive film 11 is joined with the surface of the electrode film 2 on which the electrodes 22 are provided. With this construction, the durability of the electrode pattern of the electrode film 2 against deformation can be improved, and the film 3 can be formed into any desired shape.

In addition, the electrode-provided pressure-sensitive resistance film 3 has a great advantage in terms of manufacturing cost because it can be manufactured by a simple process, as described above.

Furthermore, in the case where the film 3 is adapted to be mounted directly in a device, it is preferable that the above-mentioned manufacturing processes are incorporated in a process for making a circuit board of the device. With this process integration, it becomes possible to manufacture the film 3 in the process for manufacturing the device. Therefore, it becomes unnecessary to form dedicated detection terminals or the like for the electrodes 22. This greatly contributes to simplification of the manufacturing process and improvement in the reliability of joint portions.

(a2) Modified Embodiment of Conductive Film (Sheet-like Pressure-sensitive Member) 11

Figure 7:
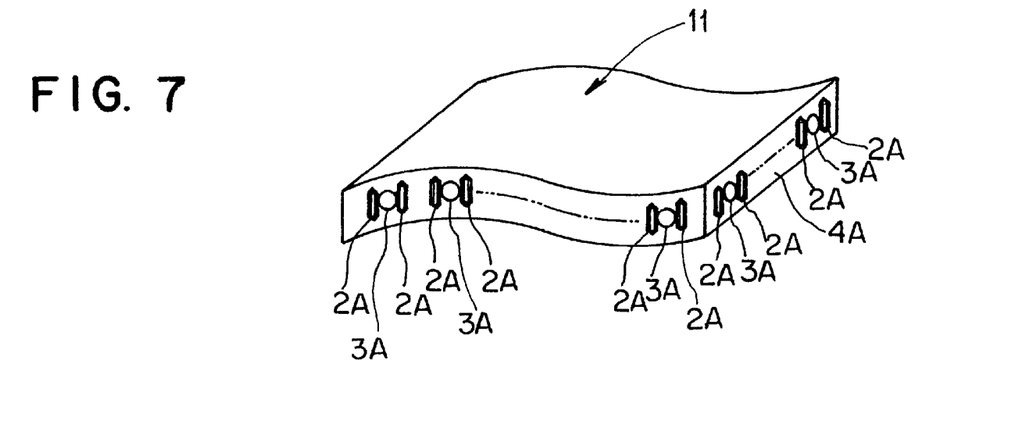
FIG. 7 is a schematic view showing a conductive film according to a modified embodiment of the present invention.

FIG. 7 schematically shows a modified form of the conductive film 11. In FIG. 7, reference character 2A denotes needle-shaped conductive particles, 3A spherical non-conductive particles, and 4A an acrylic urethane resin material. As can be seen from FIG. 7, the needle-shaped conductive particles 2A and the spherical non-conductive particles 3A are blended or mixed in the acrylic urethane resin material 4A to form a conductive film 11.

Figure 8:
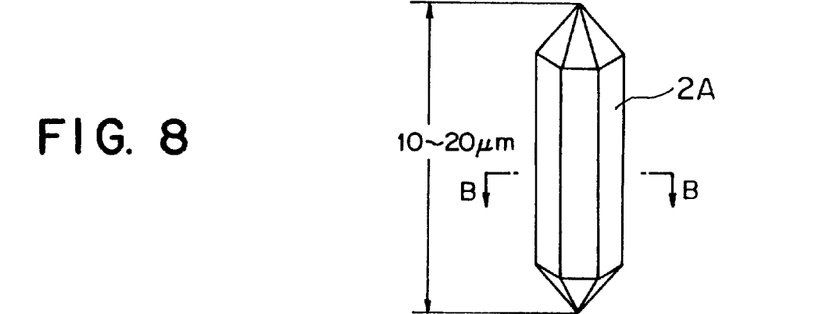
FIG. 8 is a schematic view showing the outside appearance of a needle-shaped conductive particle according to the modified embodiment.
Figure 9:
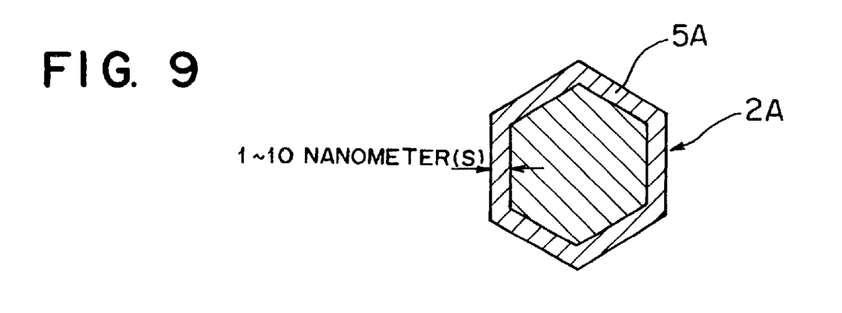
FIG. 9 is a cross-sectional view taken along the line B—B of FIG. 8.

The needle-shaped conductive particles 2A are both composed of a potassium titanate particle (chemical composition: $K_2O.TiO_2$) of a needle-like shape having a length of 10 to 20 micrometers ($\mu$m), as shown in FIG. 8, and a tin oxide film (chemical composition: $SnO_2.Sb_2O_5$) 5A coated on the entire surface of the needle-shaped particle and having a thickness of 1–10 nm, as shown in FIG. 9. The needle-shaped conductive particles 2A have a chemical composition of $K_2O.TiO_2/SnO_2.Sb_2O_5$. FIG. 9 is a cross-sectional view taken along line B—B of FIG. 8.

Thus, by virtue of the conductive tin oxide film 5A coated on the non-conductive potassium titanate particle as a electrically conductive layer, the needle-shaped particle 2A is made conductive as a whole. Accordingly, the needle-shaped conductive particles 2A is mixed with the acrylic urethane resin material 4A at a proper blending proportion such that the conductive film 11 of the modified embodiment possesses any desired resistance value. It is known through experiment that the conductive film 11 has a resistance value of about $8 \times 10^4$ (Ω) when the blending rate of the needle-shaped conductive particle 2A is about 30%. The resistant value of the conductive film 11 varies directly with the blending rate of the needle-shaped conductive particles 2A.

In the modified embodiment, the acrylic urethane resin material 4A is used as a resin material into which the needle-shaped conductive particles 2A and the spherical non-conductive particles 3A are blended, because the acrylic urethane resin material 4A has a good affinity for the needle-shaped conductive particles 2A and the spherical non-conductive particles 3A are both made of potassium titanate and therefore can be blended with the particles 2A, 3A extremely easily. It is noted, however, that other types of resin materials may be used.

Figure 10:
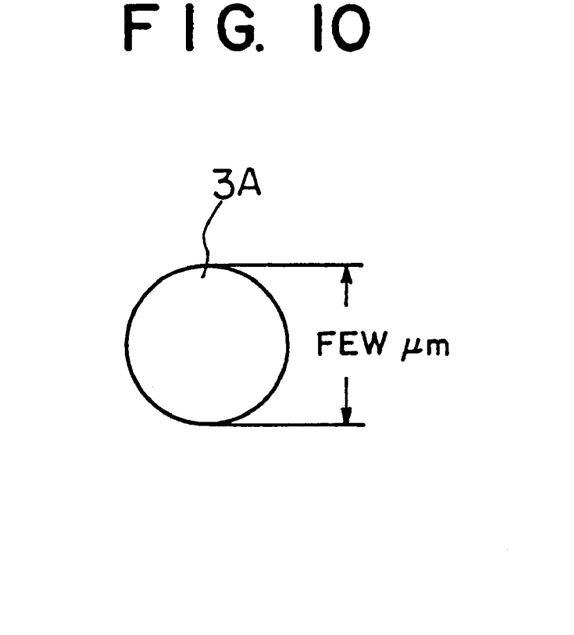
FIG. 10 is a schematic view showing the outside appearance of a spherical non-conductive particle according to the modified embodiment.

The spherical non-conductive particles 3A are potassium titanate particles having a spherical shape. In the modified embodiment, the spherical non-conductive particles 3A have a diameter of several micrometers ($\mu$m), as shown in FIG. 10. The spherical non-conductive potassium titanate particles 3A are produced by vacuum-breaking the above-mentioned needle-shaped potassium titanate particles and hence have the same chemical composition as the needle-shaped potassium titanate particles.

Figure 11:
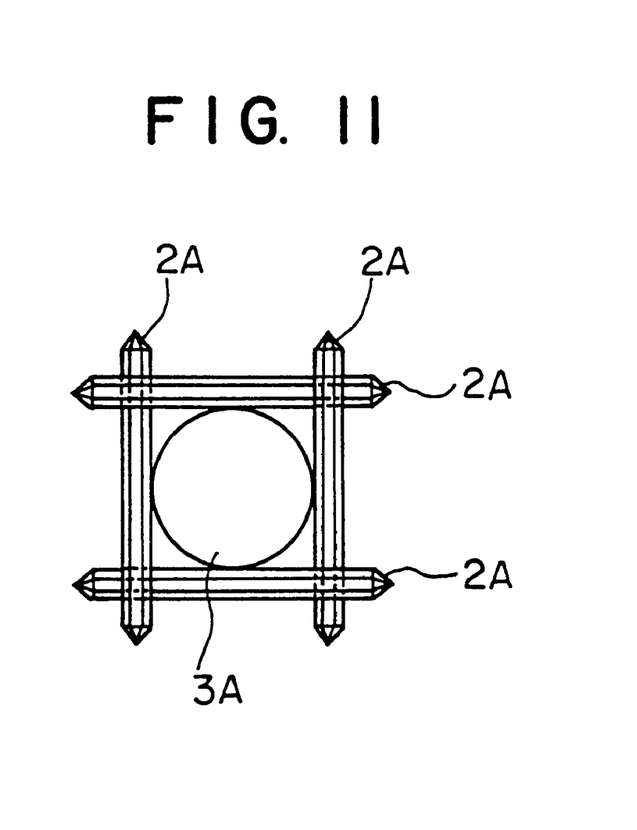
FIG. 11 is a schematic view showing a state in which the needle-shaped conductive particles are in close contact with the spherical non-conductive particle.

The spherical non-conductive particles 3A and the needle-shaped conductive particles 2A are blended with the acrylic urethane resin material 4A and are then kneaded. Since the needle-shaped conductive particles 2A and the spherical non-conductive particles 3A are made of potassium titanate, the affinity between these particles 2A and 3A is excellent. Accordingly, kneading will place the particles 2A, 3A in a state in which the needle-shaped conductive particles 2A securely and closely contact the surface of the spherical non-conductive particle 3A, as schematically shown in FIG. 11.

In this case, the length of the needle-shaped conductive particles 2A is 10 to 20 micrometers, the thickness of the tin oxide film 5A is 1–10 nanometers, and the diameter of the spherical non-conductive particles 3A is several micrometers, as described above. Therefore, the needle-shaped conductive particles 2A having a rectangular basic shape are dispersed in an optimally spaced condition via the spherical non-conductive particle 3A, such that their respective tip ends are prevented from contacting each other.

Accordingly, the needle-shaped conductive particles 2A, as schematically illustrated in FIG. 7, are uniformly dispersed within the acrylic urethane resin material 4A such that their conducting direction (perpendicularly) intersects the sheet surface.

Thus, according to the conductive film 11 of the modified embodiment, in order to make the conducting direction intersect the sheet surface, the needle-shaped conductive particles 2A made of potassium titanate and covered with the tin oxide film 5A, and the spherical non-conductive particles 3A made of potassium titanate are dispersed in the resin material 4A of the conductive film 11 such that the needle-shaped conductive particles 2A are in close contact with the surface of the spherical non-conductive particles 3A.

Accordingly, it becomes possible to reduce variations in resistance value on the sheet surface, thereby obtaining stable resistance values. Moreover, even when a very small external pressure is applied to the sheet surface, information about the applied pressure can be extremely efficiently transmitted. Thus, the transmission sensitivity for information about the applied pressure can be greatly increased. Furthermore, since the needle-shaped conductive particles 2A are dispersed at optimum intervals within the acrylic urethane resin material 4A via the spherical non-conductive particles 3A, the transmission sensitivity for information about pressures applied to the sheet surface is further greatly increased.

Figure 12:
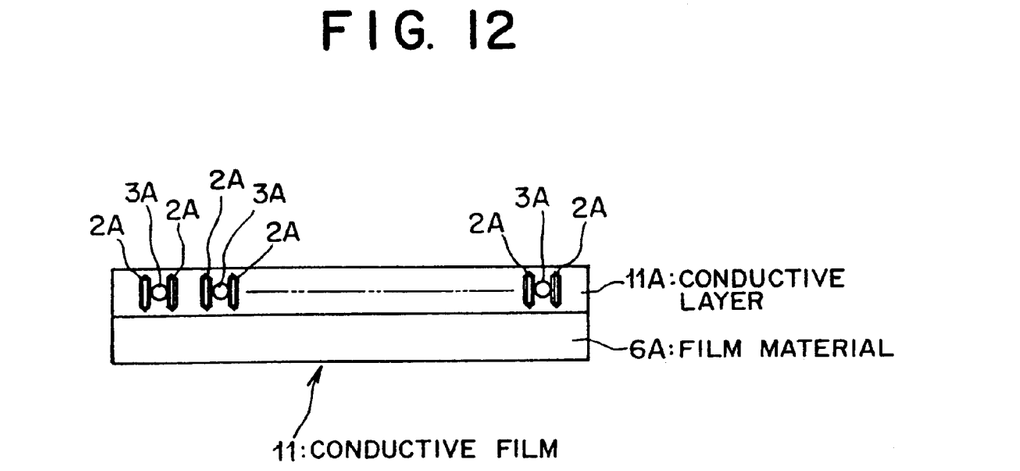
FIG. 12 is a schematic view showing another example of the method of forming the conductive film according to the modified embodiment.

The above-described conductive film 11 may be manufactured in a different manner. The needle-shaped conductive particles 2A and the spherical non-conductive particles 3A are first mixed into the acrylic urethane resin material 4A in a state in which the needle-shaped conductive particles 2A are in close contact with the surface of the spherical non-conductive particles 3A. The thus-obtained mixture is applied in uniform thickness to one surface of a film (sheet-like plastics material) of polyethylene terephthalate (PET), PES, PEI, PPI or the like, as shown in FIG. 12. The conductive film 11 thus formed is made conductive in a direction intersecting the coated surface.

The process described above is very simple compared to the aforesaid process in which the needle-shaped conductive particles 2A and the spherical non-conductive particles 3A are blended in the acrylic urethane resin material 4A and can produce the conductive film 11 while maintaining the excellent transmission sensitivity described above.

Figure 13:
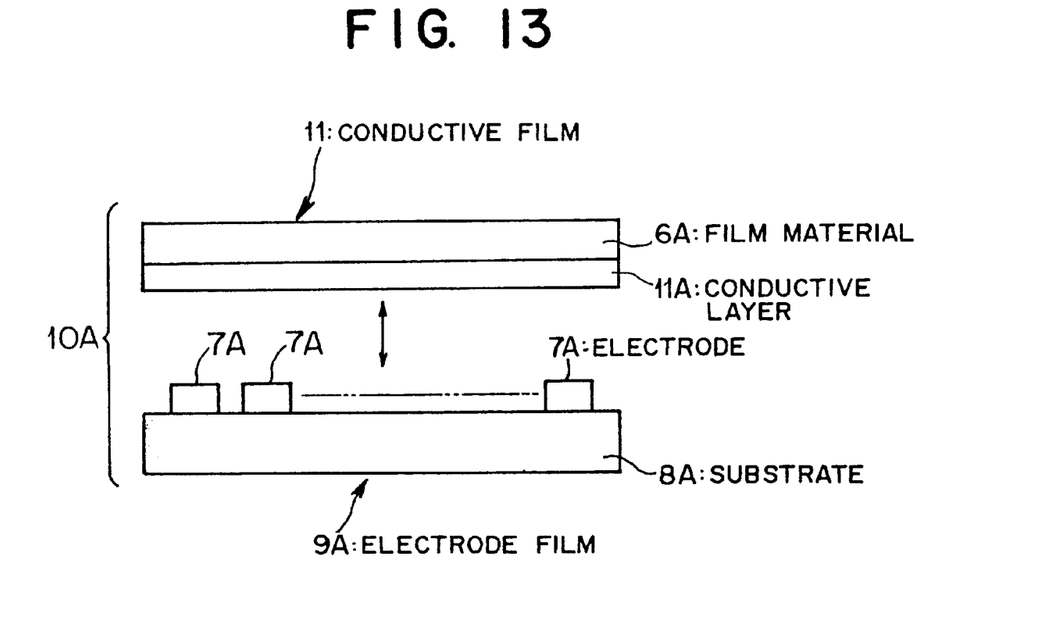
FIG. 13 is a schematic view showing the pressure-sensitive resistance film formed by using the conductive film according to the modified embodiment.

Next, to the coated surface of the conductive film 11 on which the mixture has been applied in the above-described manner; i.e., to a electrically conductive layer 11A or one surface of the film 11 shown in FIG. 7, a sheet-like electrode member (electrode film) 9A having electrodes 7A formed on a substrate 8A is bonded (or otherwise applied), as shown in FIG. 13, thereby forming a pressure-sensitive resistance film 10A. With this construction of the pressure-sensitive resistance film 10A, information about a pressure applied externally to the conductive film 11 is efficiently transmitted to the electrode film 9A even when the applied pressure is very small. Therefore, the contact area between the needle-shaped conductive particles 2A and the electrodes 7A varies remarkably.

The resistance value which is determined by the conductive film 11 and the electrode film 9A, varies with a change in the contact area, and extremely accurate information about the pressure applied to the conductive film 11 can be obtained. By using screen printing, application of the mixture in uniform thickness to the film 6A can be easily achieved. This will contribute greatly to further improvement in transmission sensitivity for information about applied pressure.

As described above, the conductive film 11 according to the modified embodiment includes the needle-shaped conductive particles 2A and the spherical non-conductive particles 3A that are dispersed in a resin material 4A such that the conducting direction of the conductive particles intersects a sheet surface and that the needle-shaped conductive particles 2A are in close contact with the surface of the spherical non-conductive particles 3A. The needle-shaped conductive particles 2A in the resin material 4A can, therefore, be dispersed uniformly such that their conducting direction intersects the sheet surface.

With this arrangement, it becomes possible to reduce variations in the resistance value on the sheet surface and thereby obtain stable resistance values. Moreover, information about the applied pressure can be very efficiently transmitted even when the sheet surface is subjected to a very small external pressure. Thus, the transmission sensitivity for information about the applied pressure can be increased greatly.

Although in the modified embodiment, the needle-shaped conductive particles 2A are needle-shaped potassium titanate particles coated with the tin oxide film 5A and the spherical non-conductive particles 3A are spherical potassium titanate particles, the present invention is not limited thereto but may include needle-shaped conductive particles and spherical non-conductive particles formed by the use of a material (non-conductive particle) other than potassium titanate.

Since the needle-shaped conductive particles 2A can be formed by applying a electrically conductive layer to the entire surface of the needle-shaped non-conductive particles, a wide choice of materials is available for the needle-shaped conductive materials 2A, which increase the flexibility in forming the film 11.

What is claimed is:

1. An electrode-provided pressure-sensitive resistance member, comprising:

a pressure-sensitive resistance layer including conductive particles of carbon or metal mixed with one kind of resin selected from the group consisting of acrylic resin, silicone resin, and polycarbonate (PBT), said conductive particles arranged such that a conducting direction of the conductive particles intersects a surface of said pressure-sensitive resistance layer;

a protective layer for protecting said pressure-sensitive resistance layer; and an electrode layer having a substrate and electrodes formed on said substrate by superposing a silver-containing member on an electrode pattern formed of a copper member;

one surface of said pressure-sensitive resistance layer being joined with said protective layer, and another surface of said pressure-sensitive resistance layer being joined with a surface of said electrode layer.

2. The electrode-provided pressure-sensitive resistance member according to claim 1, wherein said pressure-sensitive resistance layer is formed by molding a mixture of said conductive particles into a sheet shape while applying a tensile force in the width direction so as to arrange said conductive particles such that the conducting direction of said conductive particles becomes perpendicular to the surface of the pressure-sensitive resistance layer.

3. The electrode-provided pressure-sensitive resistance member according to claim 1, wherein a surface of said pressure-sensitive resistance layer and said protective layer are integrally joined by heat treatment.

4. The electrode-provided pressure-sensitive resistance member according to claim 1, wherein said electrode layer has a substrate and electrodes which are formed on the substrate by superposing a paste material of a silver alloy, using a printing process, on an electrode pattern formed of a copper foil, and subsequently heat-treating the electrode pattern and the paste material.

5. A pressure sensitive resistance sheet member, comprising an acrylic urethane resin, needle-shaped conductive particles made of potassium titanate and coated with tin oxide film, and spherical non-conductive particles made of potassium titanate, wherein said needle-shaped conductive particles and said spherical non-conductive particles are dispersed within said resin in a state in which said needle-shaped conductive particles are in close contact with the surface of said spherical non-conductive particles, whereby a conducting direction of the conductive particles intersects a surface of said pressure sensitive resistance sheet.

6. The pressure-sensitive resistance layer according to claim 5, wherein said needle-shaped conductive particles have a length of 10 to 20 micrometers, said tin oxide film has a thickness of 1 to 10 nanometers, and said spherical non-conductive particles have a diameter of several micrometers.

7. A pressure sensitive resistance sheet member, comprising an acrylic urethane resin, needle-shaped conductive particles, and spherical non-conductive particles, wherein said needle-shaped conductive particles and said spherical non-conductive particles are dispersed within said resin in a state in which said needle-shaped conductive particles are in close contact with surface of said spherical non-conductive particles, whereby a conducting direction of the conductive particles intersects a surface of said pressure sensitive resistance sheet.

8. The pressure-sensitive resistance layer according to claim 7, wherein an entire surface of said needle-shaped conductive particle is covered with tin oxide layer.

9. A pressure sensitive resistance sheet member formed by mixing needle-shaped conductive particles and spherical non-conductive particles into an acrylic urethane resin, in a state in which the needle-shaped conductive particles are in close contact with the spherical non-conductive particles surface, so as to obtain a mixture, and by subsequently applying the mixture onto a resin sheet material, whereby a conducting direction is made to intersect a sheet surface.

10. The pressure-sensitive resistance layer according to claim 9, wherein an electrode layer having a substrate and electrodes formed thereon is provided on a surface of said resin material layer, on which surface the mixture of said needle-shaped conductive particles, said spherical non-conductive particles, and the resin is applied.

11. The pressure-sensitive resistance layer according to claim 9, wherein the mixture of said needle-shaped conductive particles, said spherical non-conductive particles, and the resin is screen-printed on said resin material layer.

* * * * *